(12) United States Patent
Bantle et al.

(10) Patent No.: US 8,485,325 B2
(45) Date of Patent: Jul. 16, 2013

(54) STOP DAMPER

(75) Inventors: Ulrich Bantle, Empfingen (DE); Jürgen Eschle, Aichhalden (DE)

(73) Assignee: Karl Simon GmbH & Co., KG, Aichhalden (DE)

( * ) Notice: Subject to any disclaimer, the term of this patent is extended or adjusted under 35 U.S.C. 154(b) by 1179 days.

(21) Appl. No.: 12/084,213

(22) PCT Filed: Oct. 26, 2006

(86) PCT No.: PCT/EP2006/010344
§ 371 (c)(1),
(2), (4) Date: Apr. 28, 2008

(87) PCT Pub. No.: WO2007/048614
PCT Pub. Date: May 3, 2007

(65) Prior Publication Data
US 2009/0139049 A1    Jun. 4, 2009

(30) Foreign Application Priority Data

Oct. 28, 2005   (DE) .......................... 10 2005 052 125

(51) Int. Cl.
*F16F 9/36* (2006.01)
(52) U.S. Cl.
USPC .................................................. 188/322.18
(58) Field of Classification Search
USPC ............... 188/322.16–322.18, 381; 267/118, 267/124, 129
See application file for complete search history.

(56) References Cited

U.S. PATENT DOCUMENTS

| | | | | |
|---|---|---|---|---|
| 4,059,175 A | * | 11/1977 | Dressell et al. | 188/285 |
| 4,106,412 A | * | 8/1978 | Farris et al. | 105/198.3 |
| 4,185,719 A | * | 1/1980 | Farris et al. | 188/33 |
| 4,270,635 A | * | 6/1981 | Wossner | 188/322.17 |

(Continued)

FOREIGN PATENT DOCUMENTS

| | | |
|---|---|---|
| AT | 004 910 U1 | 1/2001 |
| DE | 40 09 034 A1 | 9/1991 |

(Continued)

OTHER PUBLICATIONS

Jörnsen Reimpell and Helmut Stoll, "Fahrwerktechnik: Stoβ- und Schwingungs-dämpfer", 1989, (p. 30-32), 2., völlig überarbeitete und erweiterte Auflage, VOGEL Buchverlag Würzburg, printed in Germany.

*Primary Examiner* — Bradley King
*Assistant Examiner* — Vishal Sahni
(74) *Attorney, Agent, or Firm* — Pauley Petersen & Erickson

(57) ABSTRACT

A stop damper including a damper member with a cylinder. A piston is moveably guided inside a receiving space of the cylinder. The cylinder has a sliding surface against which the piston rests with a sealing element. A braking force that acts upon the piston can be applied using the air pressure generated in the receiving space because the piston is displaced, the receiving space being connected to the environment via an air-conducting connection to reduce the air pressure. In order to improve the braking effect of the sliding element, the sealing element of the piston and the sliding surface of the cylinder can contact each other in at least some areas via a defined rubbing surface geometry, the peak-to-valley height of the sliding surface being <1 μm and the peak-to-valley height of the facing surface of the sealing element being =4.5 μm in at least some areas.

31 Claims, 6 Drawing Sheets

U.S. PATENT DOCUMENTS

| | | | |
|---|---|---|---|
| 5,000,299 A * | 3/1991 | Goto et al. | 188/267.1 |
| 5,435,421 A * | 7/1995 | Beck | 188/313 |
| 5,598,904 A * | 2/1997 | Spyche, Jr. | 188/287 |
| 5,620,067 A * | 4/1997 | Bauer et al. | 188/322.19 |
| 5,797,593 A * | 8/1998 | Oyaizu | 267/64.12 |
| 5,884,959 A * | 3/1999 | Hillen | 293/134 |
| 5,890,413 A * | 4/1999 | Bayer et al. | 92/71 |
| 5,961,102 A * | 10/1999 | Oyaizu | 267/120 |
| 6,279,913 B1 * | 8/2001 | Iwashita et al. | 277/442 |
| 6,516,926 B2 * | 2/2003 | Lisenker et al. | 188/267.1 |
| 2001/0052441 A1 * | 12/2001 | Schmidt | 188/280 |
| 2004/0007431 A1 * | 1/2004 | Barbosa | 188/72.4 |
| 2004/0261615 A1 * | 12/2004 | Yanagimoto et al. | 92/208 |
| 2005/0011711 A1 * | 1/2005 | Schilz | 188/276 |
| 2006/0081124 A1 * | 4/2006 | Clayton et al. | 92/169.1 |
| 2007/0271732 A1 * | 11/2007 | Bantle et al. | 16/84 |

FOREIGN PATENT DOCUMENTS

| | | |
|---|---|---|
| DE | 40 12 110 A1 | 10/1991 |
| DE | 197 17 937 A1 | 5/1998 |
| DE | 100 54 904 A1 | 5/2002 |
| DE | 101 27 429 C1 | 1/2003 |
| DE | 102 14 596 A1 | 1/2003 |
| DE | 103 13 659 B3 | 9/2004 |
| DE | 20 2004 019 395 U1 | 4/2005 |
| DE | 10 2004 044 898 A1 | 7/2005 |
| EP | 1 236 925 A2 | 9/2002 |
| EP | 1 260 159 A2 | 11/2002 |
| WO | WO 2004/067988 A1 | 8/2004 |
| WO | WO 2005/010395 A1 | 2/2005 |
| WO | WO2005054614 * | 11/2007 ......... 16/84 |

\* cited by examiner

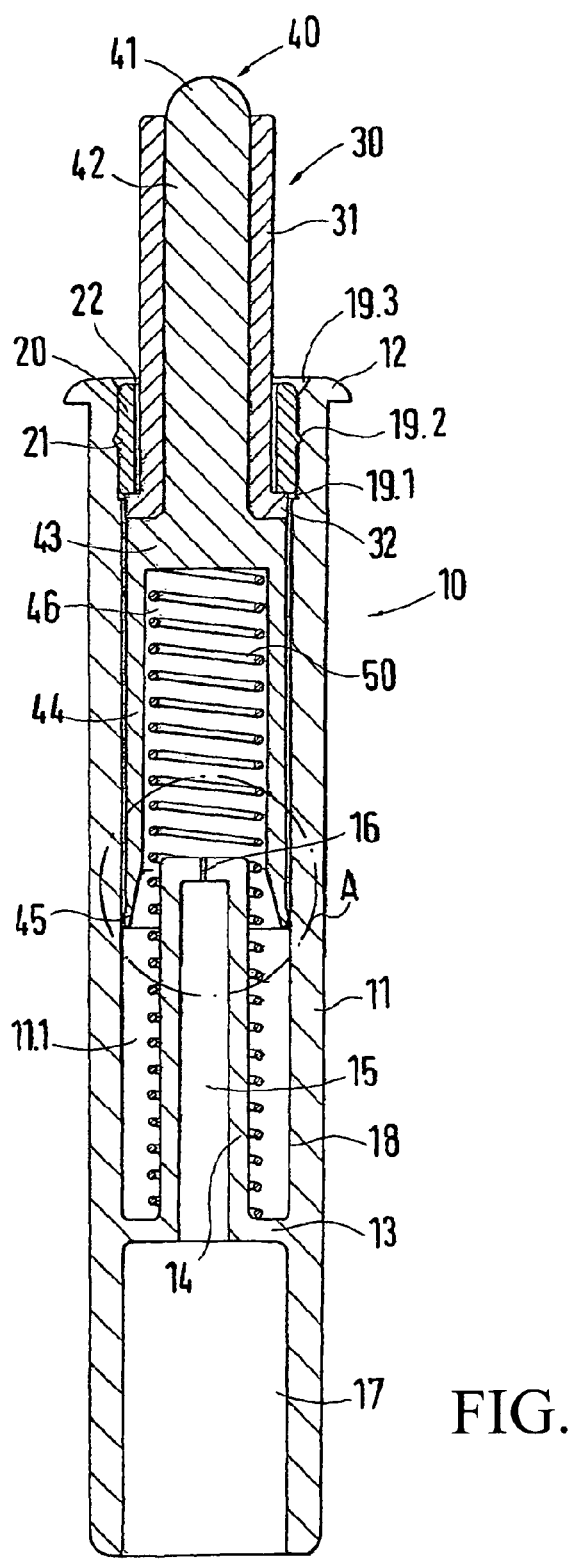
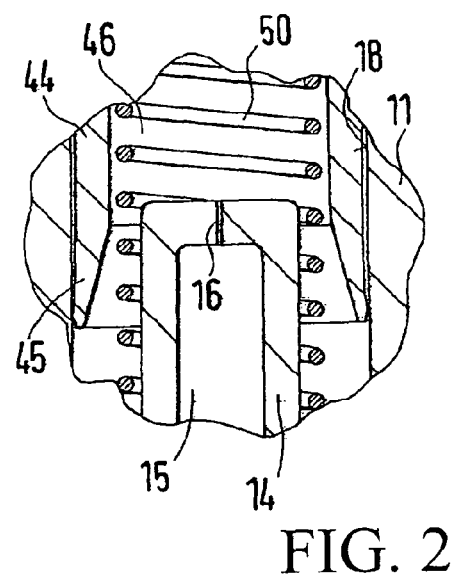
FIG. 1
FIG. 2

STOP DAMPER

BACKGROUND OF THE INVENTION

1. Field of the Invention

This invention relates an end stop damper with a damper body having a cylinder, wherein a piston is displaceably guided inside a reception chamber of the cylinder, the cylinder has a sliding surface against which the piston rests with a sealing element, wherein as a result of the displacement of the piston, a braking force acting on the piston can be exerted by the air pressure formed in the reception chamber, and for releasing the air pressure, the reception chamber is connected with the surrounding space via an air guidance connection.

2. Discussion of Related Art

An end stop damper is known from German Patent Reference DE 103 13 659 B3. The end stop damper has a cylinder, in which a piston is guided in a linearly displaceable manner. In this case, the piston is sealingly conducted on the interior wall of the cylinder, so that two pressure chambers are formed inside the cylinder.

In the course of retracting the piston, air is compressed in an overpressure chamber. At the same time, a pressure which is less than the pressure in the overpressure chamber is generated in an underpressure chamber.

Overflow channels of reduced cross section are provided for permitting a continuous pressure equalization between these two pressure chambers.

The air from the overpressure chamber flows into the underpressure chamber through the overflow channels.

The piston has a bellows section for increasing the braking force, which is expanded by a pressure difference existing between the overpressure chamber and the underpressure chamber. In the process, it comes to rest against the interior wall of the cylinder and thus increases the friction of the piston. The bellows section is made in the form of a sleeve made of a flexible material. The piston is designed in two parts for fixing the bellows section in place, and the bellows section is clamped between the piston parts.

This known end stop damper requires a large parts outlay.

SUMMARY OF THE INVENTION

It is one object of this invention to provide an end stop damper of the type mentioned above but which has an improved braking effect.

This object of this invention is attained with a sealing element of the piston and the sliding surface of the cylinder that touch at least over a friction surface of a defined geometry, wherein the peak-to-valley height of the sliding surface Ra<1 µm and the peak-to-valley height of the facing surface of the sealing element is ≧4.5 µm, at least in parts.

An ideal damping behavior occurs with this pairing of the friction surfaces. In this case friction, both at high, as well as low retraction speed of the piston, is always such that the retraction movement is not hindered by any impermissibly large adhesive friction portions.

However, the air removal from the reception chamber is optimized as a result of the pairing of the friction surfaces. A clearly higher peak-to-valley height would lead to a strong air removal between the sealing element and the sliding surface, which results in a clear reduction of the damping effect.

This object of this invention is achieved with a surface peak-to-valley height of the sealing element and/or of the sliding surface which is created by a periodic structure, for example a groove structure.

A good guidance of the sealing element during the displacement movement of the piston results with this design. The guidance can be optimized if the linear extension of the grooves of the groove structure are arranged transversely to the movement direction of the piston. In this case, the grooves of the groove structure can be cut into the sliding surface encircling it and transversely in relation to the movement direction of the piston, wherein the grooves extend at an angle of ≧0 and <90° in relation to the movement direction of the piston. The angle advantageously lies in a range between ≧0 and <5°. Such a structure can be simply created with lathe technology. The surface geometry then being created has characteristic peak-to-valley values which optimally affect the wear characteristics. During this, it is possible for the angle of attack to be selected so that over its entire circumference the annularly encircling sealing element only extends over a small number of grooves at the same time. In this way, only a groove cross section is available which, as a function of the elasticity of the sealing element, forms defined air flow-through gaps.

In one embodiment of this invention, for the sealing element made of a flexible material, for example an elastomer, the surfaces of the sealing element have a peak-to-valley height Ra≧0.4 µm in the area facing the sliding surface. The elastomeric material can offer good material properties for the intended sealing job. However, in the present application this material has a tendency to make too strong of a bond with the sliding surface of the piston at a peak-to-valley height of ≧0.4 µm. In the end, this leads to bad damping characteristics obtained. In this case, the sealing element is made of a thermoplastic elastomer. This material can be cost-effectively worked by an injection molding process. It is possible to reduce the costs for the material by employing a thermoplastic material on an olefin basis.

An end stop damper in accordance with this invention has the sliding surface of the cylinder with a peak-to-valley height Ra≧0.05 µm, at least in parts.

In contrast to the sliding surface which is hard in comparison with the sealing element, this represents a peak-to-valley range in which the adhesion of the sealing element because of the influence of cohesion is effectively prevented.

In one embodiment of this invention, the piston has a bellows section which, as a function of the pressure conditions in the reception chamber, is in an active connection with the cylinder. During the push-in movement of the piston into the cylinder, the bellows section expands as a result of the interior pressure existing in the cylinder and is placed against the sliding surface of the cylinder, and in the process aids the braking effect.

The bellows section can have areas of different expansion capabilities, at least in the active area which is in contact with the cylinder.

It has been determined that in the direction of the displacement movement the bellows section needs a certain amount of inherent stiffness, so that it is not impermissibly deformed by the braking forces occurring during the braking process. On the other hand, with a bellows section having a high degree of inherent stiffness, a large portion of energy is destroyed because of the expansion process. Because the bellows section has areas of differing expandability, the expansion of the bellows in the areas of great expandability can occur with reduced energy consumption. With this the built-up interior pressure in the reception chamber can be effectively converted into braking work. At the same time the areas of little expandability sufficiently stiffen the bellows section so that it is not impermissibly deformed as a result of the acting braking forces.

In this case, such an end stop damper can be realized with less costly parts, if the areas of differing expandability are formed by portions of the bellows section having different wall thicknesses. The bellows section can then be embodied in one piece.

It is possible to have large expansion sections in a simple manner if the bellows section has groove-shaped cutouts forming a change in the cross section of the bellows section. If the end stop damper is designed so that the cutouts extend in the direction of the displacement movement of the piston, or at an angle of less than 90° relative to the direction of the displacement movement, or spirally, the inherent stiffness of the bellows section in the direction of the displacement movement is maintained.

In one embodiment of this invention, a displacement arrangement of the piston can be actuated as a function of the size of the air pressure, and the displacement arrangement brings a braking section into active connection with the cylinder for damping the displacement movement of the piston.

Thus, the braking section is switched via the displacement arrangement as a function of the air pressure. Thus it is possible to increase the braking effect of the piston.

Thus it is possible for the piston to be connected to a piston rod, and for the displacement arrangement to be actuated by the piston rod. In this case, the force introduced into the piston rod can be used for the actuation of the displacement arrangement.

A simple and particularly effective braking arrangement results if, when the displacement arrangement is actuated, the cross sectional dimension of the braking section can be changed. In accordance with one embodiment of this invention, the bellows section and the piston can be connected to form one part with each other, and/or the piston rod can be formed as one part on the piston. With the single piece bellows section and the piston, the cost outlay for parts and assembly is reduced.

The cost outlay for sealing, which is required with the prior art for sealing the bellows section in respect to the bellows, is reduced.

With this invention it is possible to combine the components of the bellows section and the piston, which customarily have different materials and are employed for completely different purposes, into one unit.

The structural cost outlay can be still further reduced if the piston rod is formed on the piston as one part.

In one embodiment of this invention, a support body is assigned to the piston rod, or it has one so that the support body has an impact side arranged outside the damper body, and the support body is supported on the piston by a shoulder.

Depending on the design, the piston rod can be stiffened by the support body. It is simultaneously possible to absorb the impact force of, for example, an impacting door or flap, by the support body, and it can be transferred at least partially to the piston.

This is an advantage if the piston and the bellows section are made of a flexible material. In that case, the impact force acts on the piston in a spring-elastic manner, and thus a portion of the impact force is destroyed by hysteresis.

With the flexible embodiment of the piston and bellows section it is possible for a pairing of material with the cylinder, which permits strong damping through large coefficients of friction.

If the piston rod is also made of a flexible material, for reasons of sturdiness the piston rod is stiffened by a sheath element.

In one embodiment of this invention, on a side facing away from the piston, the piston rod forms an impact element made of a flexible material. The impact force can be absorbed by the impact element and can be partially damped.

If the bellows section has a cylinder-shaped portion, which is maintained at a distance from the interior wall of the cylinder, and the area surrounded by the cylinder-shaped portion is assigned to a pressure chamber of the cylinder, the bellows section, when charged with pressure, can be placed circumferentially against the interior wall of the cylinder and can there cause an even and extensive braking effect.

It is possible to achieve an effective conversion of the pressure into a braking force in a useful way if the areas of different expansion capability are arranged in the cylinder-shaped portion of the bellows section.

The functionality of the bellows section can be increased if the cylinder-shaped portion of the bellows section forms a spring receptacle, in which a spring is at least partially received, and the spring supports the piston on the cylinder in a direction opposite the push-in movement of the piston into the cylinder.

A further structural simplification results if the sealing element formed on the bellows section seals a pressure chamber and an underpressure chamber of the cylinder against each other.

If the areas of differing expansion capability extend as far as the formed-on sealing element, large-surfaced expansion areas result.

The braking effect of the end stop damper can be increased if the underpressure chamber and/or the pressure chamber are in an air guidance connection with the surroundings by at least one opening.

This is possible if the openings, or throttle members assigned to the openings, are designed so that a metered airflow is achieved.

It is possible to achieve an air volume flow for a controlled pressure reduction, and simultaneously good damping, if at least one of the openings has a diameter $D<0.2$ mm, preferably $<0.1$ mm. Diameters $<0.1$ mm display a good throttle effect for use in furniture construction.

This damping can also be satisfactorily achieved if the ratio of the cross-sectional surface of the piston in the area facing the hollow space to the opening cross section of the opening is greater than 4,000/1.

BRIEF DESCRIPTION OF THE DRAWINGS

This invention is explained in greater detail in view of an exemplary embodiment represented in the drawings, wherein:

FIG. 1 shows an end stop damper in a lateral view and in section;

FIG. 2 shows a detailed representation marked by "A" in FIG. 1;

DETAILED DESCRIPTION OF INVENTION

Figure 3:
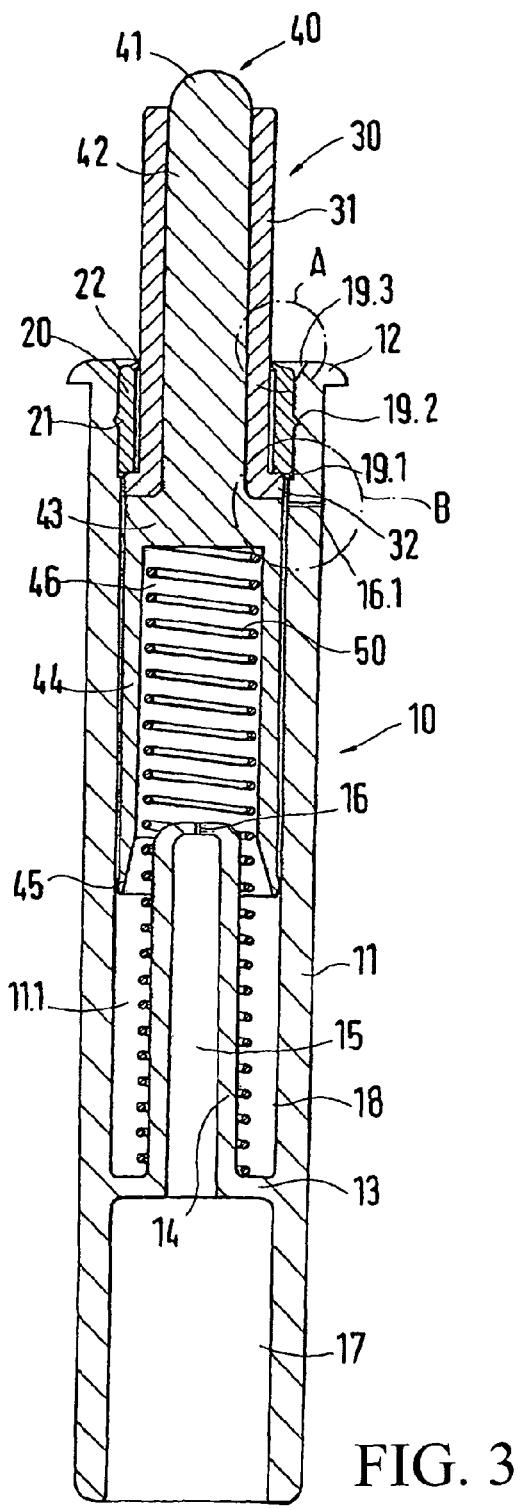
FIG. 3 shows a further embodiment of an end stop damper in a lateral view and in section.
Figure 4:
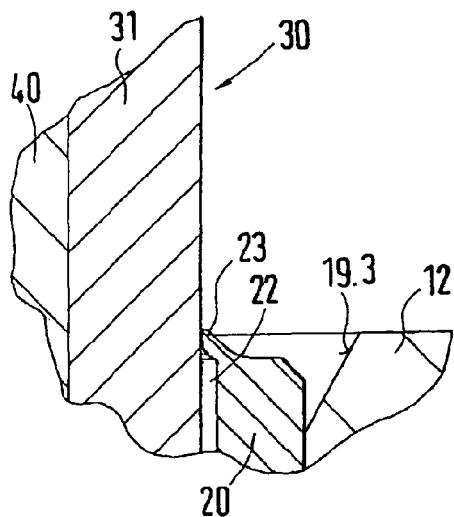
FIG. 4 shows a detailed representation marked by "A" in FIG. 3.

An end stop damper with a linearly extending damper body 10 is represented in FIG. 1. The damper body 10 forms a cylinder 11. The cylinder 11 surrounds a reception chamber 11.1, in which a piston 43 of a sliding element 40 is maintained in a linearly displaceable manner.

A spring guidance device 14 projects into the reception chamber 11.1 which is formed in one piece on a bottom 13 of the damper body 10 in the shape of a hollow cylinder. The spring guidance device 14 has an opening 16 in the form of a bore in the area of or near a side facing away from the bottom 13. The opening 16 creates a spatial connection between the reception chamber 11.1 and an air guidance channel 15, which is surrounded by the spring guidance device. Here, the diameter of the opening is <0.1 mm in order to make a metered air exchange between the reception chamber 11.1 and the air guidance channel 15 possible. In place of the bore it is also possible to realize any arbitrary other opening cross section.

Good damping results are achieved if the cross-sectional surface of the piston 43 in an end area facing the reception chamber 11.1 has a ratio of 4,000/1 in respect to the opening cross section of the opening.

The air guidance channel 15 terminates in a hollow space 17 formed by a cylinder-shaped end section of the damper body 10. The damper body 10 is made as an injection-molded part. The interior surface of the cylinder 11 is embodied as a sliding surface 18. For the purpose of taking it out of the mold, it has slight opening cone, so that the reception chamber 11.1 slightly widens toward the area of the inlet opening located opposite the bottom 13.

As mentioned above, a sliding element 40 is guided in the reception chamber 11.1. The sliding element 40 is embodied in one piece and is comprised of the piston rod 42, the piston 43 and the bellows section 44. The sliding element 40 is also made as an injection-molded part and is of a flexible material, for example an elastomer on olefin basis, in particular a TPE material, to which slip agents can also be added for improving the friction properties.

But the cylinder is made of a thermoplastic material, for example of ABS, with or without a slip agent, or of POM.

The piston rod 42 is formed on the piston 43 on the side located opposite the bellows section 44. It is cylinder-shaped in cross section and protrudes out of the reception chamber 11.1 of the damper body 11. At its end it has an impact element 41 designed as an end cap.

In an alternative embodiment, it is possible to omit the piston rod 42 formed on the piston 43. In this case, the piston rod is formed by the support body 30 alone. In the present construction there is no mechanical connection between the piston 43 and the support body 30 required. However, in this case the centering of these two components is advantageous.

The piston rod 42 is surrounded by a support body 30. Thus, the latter has a hollow-cylindrical receptacle, with a cross section matched to the exterior cross section of the piston rod 42 and formed by a sheath element 31. The material of the support body 30 is rigid, so that the piston rod 42 is stiffened. As FIG. 1 clearly shows, the support body 30 is supported on the piston 43 by means of a radially widened shoulder 32. The shoulder 32 can guide the piston 43. In that case it is radially expanded in such a way that, together with the interior wall 19 of the reception chamber 11.1, it forms a guidance. Depending on the design of the shoulder 32, it is possible to minimize a danger of tilting of the piston 43.

The bellows section 44 protrudes into the reception chamber 11.1 and is embodied as a hollow cylinder, preferably with a constant wall thickness, so that it has the same material properties over its circumference, in particular a uniform expansion behavior.

However, the wall can also be crowned or, to achieve a varying force, can have a changing cross section. For example, a cross section of a reduced cross section can be used. The bellows section 44 has a circumferential sealing element 45 at a free, an open end, which sealingly rests with a sealing lip against the sliding surface 18 of the reception chamber 11.1. The sealing element 45 is embodied so that it seals over the entire sliding area and, based on the elasticity of its material, compensates the opening cone of the reception chamber 11.1.

Figure 12:
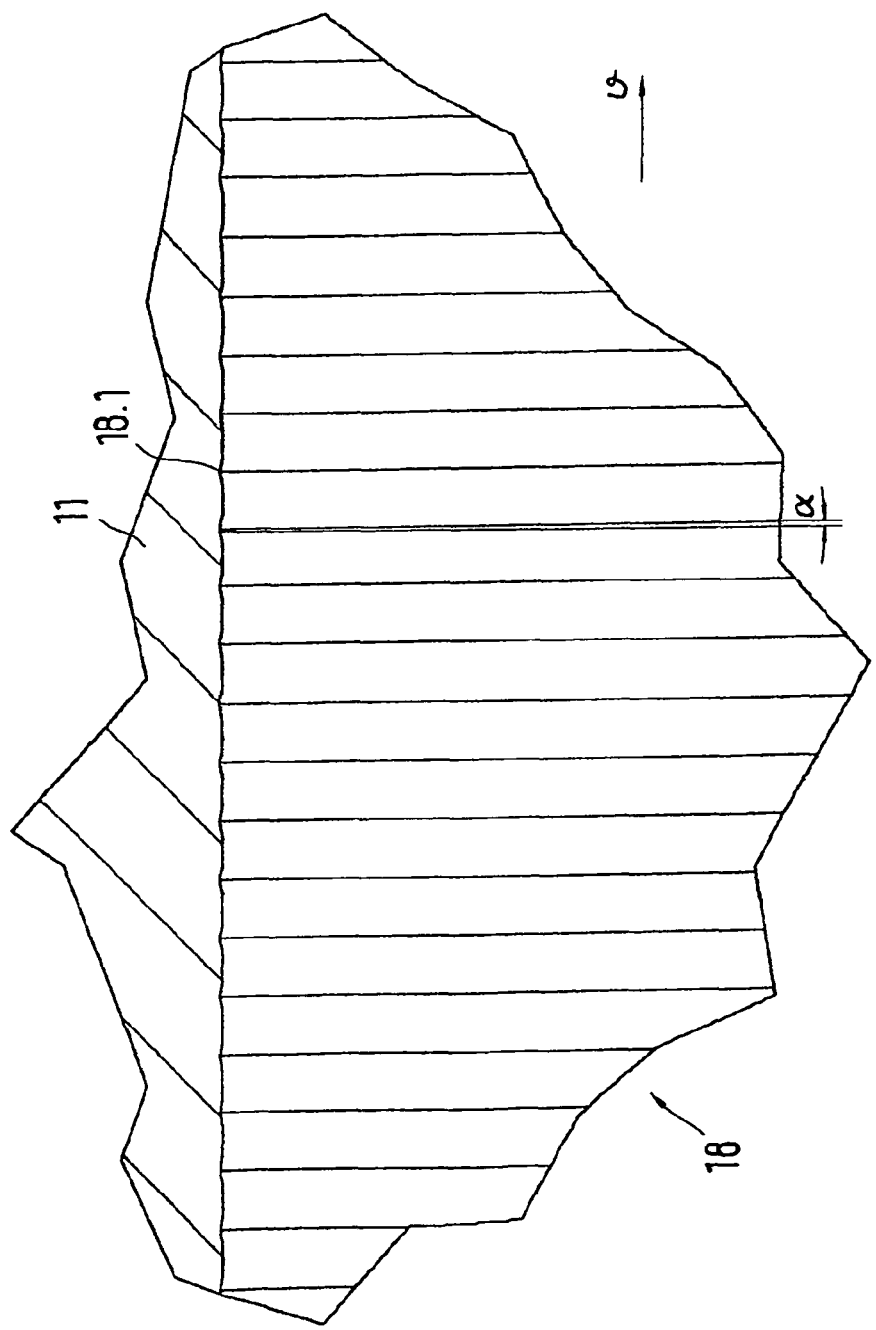
FIG. 12 shows a portion of a cylinder of the end stop damper in accordance with FIG. 1.

The peak-to-valley height Ra of the sliding surface 18 lies in the range between 0.05 and 1 µm. The peak-to-valley height of the sealing element 45 in the contact area with the sliding surface 18 lies in the range between 0.4 and 4.5 µm. These pairings of the peak-to-valley heights result in ideal dampening behavior. For use as end stop dampers for furniture, good damping power under the conditions can occur at a peak-to-valley height Ra of 0.05 and 0.2 µm of the sliding surface 18 and Ra=0.5 to 3 µm of the sealing element 45. In this case, the peak-to-valley height of the surface is provided by a groove structure as represented in FIG. 12. Here, the linear extension of the grooves 18.1 extends transversely to the movement direction of the piston 43 (v=see FIG. 1). In this case, the groove structure is predetermined by the tool shape, the injection molding tool. A groove structure is preferably created over the entire surface by a lathe, so that the grooves 18.1 circulating on the interior wall of the cylinder are at an angle ($\alpha$), for example 0.2° to 5°, in relation to the movement direction of the piston 43. The angle ($\alpha$), advance, is sufficiently small here, so that the lip-shaped sealing element always only passes over a small number of grooves 18, <20 grooves (18), at the same time.

The groove structure illustrated in FIG. 12 assures a sufficient sealing effect, so that the sealing element assures the pressure build-up.

The groove structure, the negative contour of the tool, can be polished, to produce the surface structure represented in FIG. 12. This groove structure has a large support component, by which the sliding properties can be influenced.

The detailed plan view in accordance with FIG. 2 makes it possible to accurately see the exact embodiment of the sealing element 45.

The bellows section 44 surrounds a spring receptacle 46, into which a spring 50 is inserted. Here, the spring receptacle 46 is dimensioned so that it prevents the spring 50 from buckling.

The spring 50 is supported on the piston 43 with one of its ends. The other spring end rests against the bottom 13. The spring 50 is placed atop the spring guidance device 14, which also prevents bulging of the spring 50. The spring guidance device 14 is designed so that while pushing the sliding element 40 in, there is room in it for the spring guidance device 14 and the spring 50, and the piston movement is not hampered.

An end stop element 20 is used for fixing the sliding element 40 in place in the extended end position represented in FIG. 1. It is designed as a ring and has a circumferential bead-shaped snap-in shoulder 21 on its exterior circumference. The end stop element 20 has a hollow-cylindrical passage 22, through which the sheath element 31 of the support body 30 is guided. In this case, the exterior diameter of the sheath element 31 is matched to the interior diameter of the passage, so that a stable linear guidance of the support body 30 results. Here, the pairing of materials between the support body 30 and the end stop element 20 is selected so that smooth seating results.

During assembly, the end stop element 20 can be easily inserted into the reception chamber 11.1 through an insertion widening 19.3 in the damper body 10. In this case, the insertion movement is limited by a shoulder 19.1 of the damper body 10. In its assembly position, the end stop element 20 snaps with its snap-in shoulder 21 into the snap-in receptacle 19.2.

In the end position represented in FIG. 1, the end stop element 20 supports the support body 32, and therefore the piston 43, on the shoulder 32 against the bias of the spring 50.

The mode of functioning of the end stop damper, which for example is employed in a piece of furniture with a hinged flap, is now briefly described. The furniture body of the piece of furniture customarily has a receiver bore, into which the damper body 10 with its cylindrical exterior contour can be inserted. Here, the flange 12 of the damper body 10 rests against the furniture body in the area of or near the receiver bore.

The closing flap initially impacts on the impact element 41 of the piston rod 42. The impact noise of the flap is compensated by the resilient properties of the material of the impact body 41. The impact body 41 is deformed as a function of the impact energy of the flap. With a strong impact, the impact body 41 is completely deformed into the sheath element 31, and the flap comes into contact with the free end of the sheath element 31. The force is transferred to the piston 43 via the piston rod 42, of the sheath element 31. Here, the ring-shaped contact of the shoulder 32 against the piston 43 assures an even force distribution. A portion of the energy can be damped by the elastic deformation of the piston 43, depending on the strength of the impact energy.

The piston 43 is displaced into the reception chamber 11.1. During this pressure is built up in the reception chamber 11.1, aided by the sealing effect of the sealing element 45. The pressure is simultaneously dissipated via the opening 16. If the pressure build-up takes place over a short period of time, the pressure dissipation takes place slowly and continuously via the opening 16. A damping overpressure is created in the reception chamber 11.1 and acts on the bellows section 44. Since ambient pressure prevails in the space between the interior wall 18 and the exterior surface of the bellows section 44, a pressure drop is created.

This expands the bellows section 44, so that it is placed against the interior wall 18. In the process, it aids damping because of sliding friction. The friction is correspondingly great because of the flexible properties of the material of the bellows section 44. The groove structure represented in FIG. 12 assures that the bellows section does not additionally adhesively stick too strongly to the interior wall 18. Thus a very strong sliding friction can be created, which leads to heavy wear on the bellows section 44. In this case, the groove structure effectively aids an advantageous, even damping behavior, along with a simultaneous optimization of wear. Once the pressure drop is reduced, the bellows section 44 again returns into its initial position.

After the piston rod 42 is relieved, the piston 43, aided by the spring 50, again returns into its initial position as shown in FIG. 1. In the process, ambient air is drawn into the reception chamber 11.1 via the opening 16.

The opening is dimensioned so that the following properties of the end stop dampers are provided: controlled, slow pressure reduction for achieving satisfactory damping; and rapid pressure equalization during the restoring movement of the piston 43.

These properties can be optimally provided by the conditions described in the claims and in this specification.

A further embodiment variation of an end stop damper is represented in FIGS. 3 to 6. The construction shown substantially corresponds to the design in accordance with FIGS. 1 and 2, so that reference is made to the above remarks, and only the differences are addressed.

As the detail "A" in accordance with FIG. 2 illustrates, a seal 23 is provided in the area of the end stop element 20, which seals the exterior circumference of the sheath element 31. In this way an underpressure chamber 22, which is sealed against the surroundings, is created in cooperation with the seal 45 of the bellows section 44. The seal 23 could be arranged at any arbitrary other location to achieve this purpose.

Figure 5:
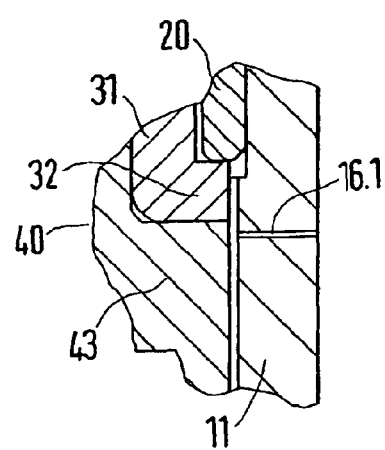
FIG. 5 shows a detailed representation marked by "B" in FIG. 3.

The underpressure chamber is in spatial connection with the surroundings via an opening 16.1, such as shown in FIG. 5. For a controlled pressure equalization, the opening 16.1 has the shape described in the claims and in this specification. While pushing the piston 43 in, a pressure is created in the underpressure chamber 22, which is reduced in comparison to the surroundings. In the process, a pressure drop is created between the reception chamber 11.1 and the underpressure chamber 22, which leads to the expansion of the bellows section 44 with a strong braking effect.

A functioning of the end stop damper is also assured in accordance with this invention if an underpressure chamber 22 is created in accordance with the exemplary embodiment of FIGS. 3 and 5, and ambient pressure always prevails in the reception chamber 11.1, for example if the opening 16 is dimensioned correspondingly large.

Figure 6:
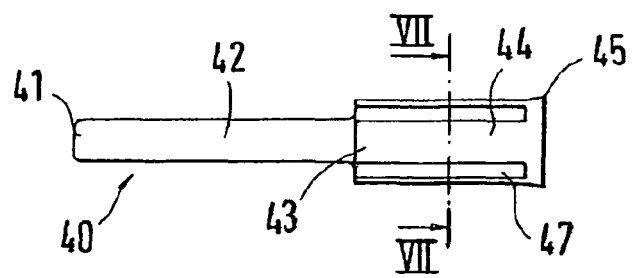
FIG. 6 shows a component of the end stop damper including a piston rod and a piston, in a lateral view.
Figure 7:
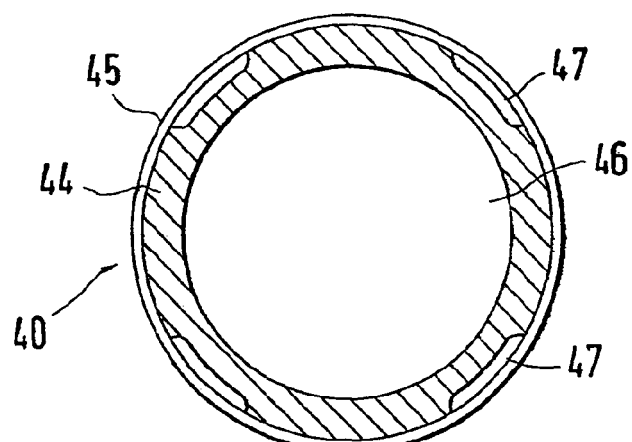
FIG. 7 shows the component in accordance with FIG. 5 in section taken along line VII-VII of FIG. 6.

Two embodiments of the sliding element 40 are represented in detail in FIGS. 6 to 9. As explained above, the sliding element 40 has a piston 43 with a bellows section 44. As FIG. 7 shows, the bellows section 44 has groove-shaped cutouts 47 that extend, starting at the connection area of the piston 43 with the piston rod 42, as far as the bellows section 44 areas of different wall thickness. Thus the bellows section 44 is divided into areas of different wall thickness.

When the cylinder is charged with overpressure in the reception chamber 11, the bellows section 44 is expanded more in the area of the cutouts 47 than in the remaining areas of the bellows section 44.

As FIG. 7 shows, the cutouts 47 of the bellows section 44 extend over a relatively large circumferential area. The areas of the bellows section of reduced expanding capability remaining between the individual cutouts 47 stiffen the bellows section 44 in the direction of the center linear axis of the piston 43.

Figure 8:
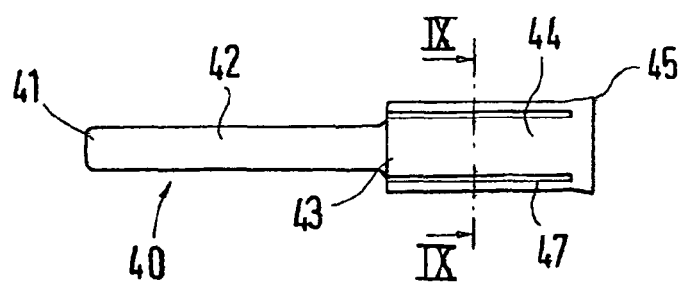
FIG. 8 shows an alternative embodiment of the component in accordance with FIGS. 6 and 7.
Figure 9:
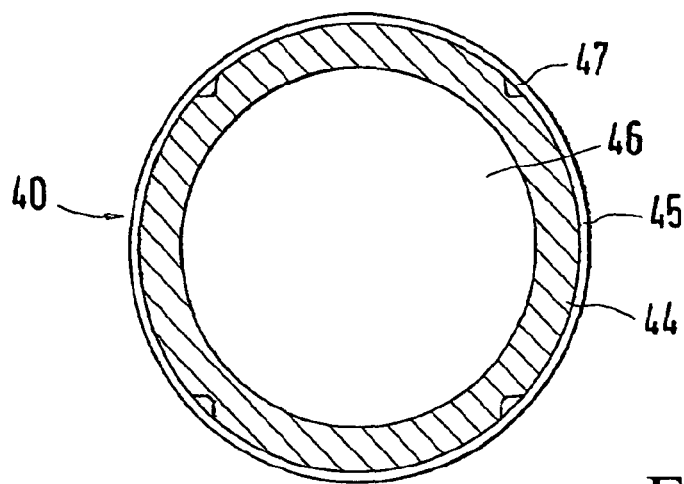
FIG. 9 shows the component in accordance with FIG. 8 taken along line VIII-VIII of FIG. 8.

FIGS. 8 and 9 show another embodiment of the sliding element 40 represented in FIGS. 6 and 7. As these drawings disclose, the cutouts 47 are designed as grooves which are V-shaped in cross section. Thus, the extent of expandability of the bellows section 44 can be adjusted by the size and the shape of the cutouts 47.

Figure 10:
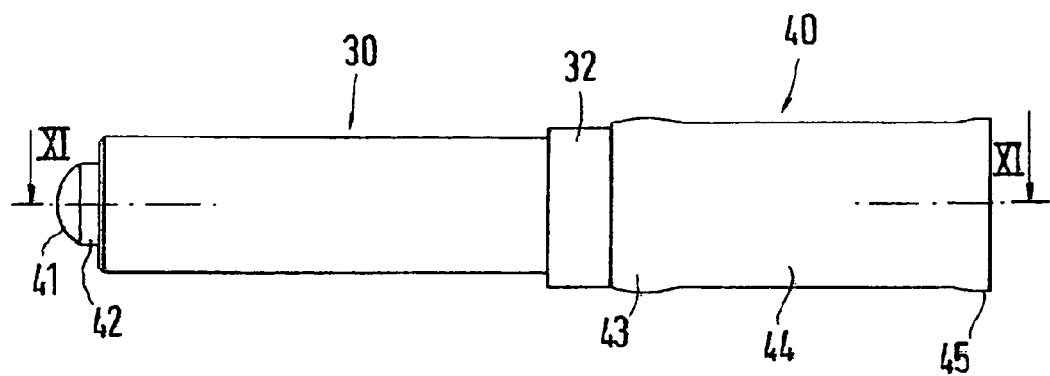
FIG. 10 shows a combination of the component in accordance with FIGS. 8 and 9, having a sheath element, in a lateral view.
Figure 11:
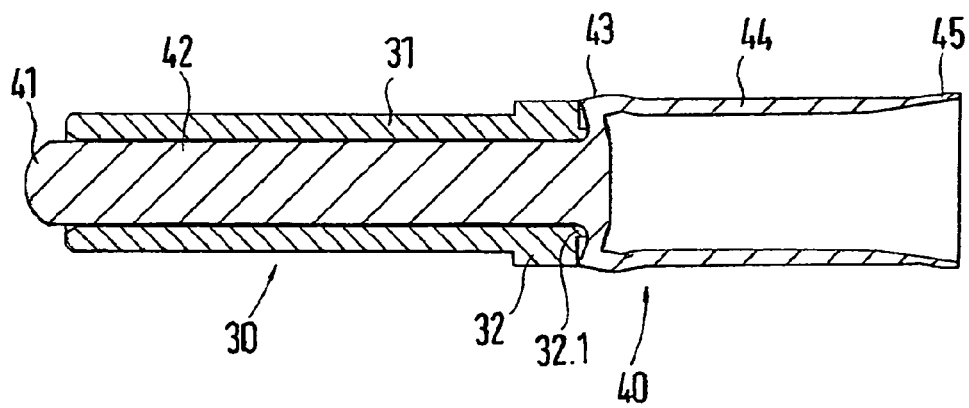
FIG. 11 shows the representation in accordance with FIG. 10 in section taken along line IX-IX of FIG. 10.

FIGS. 10 and 11 show a further embodiment of the sliding element 40. The sliding element 40 is substantially constructed in the same way as the sliding element 40 represented in the previously explained drawings.

No cutouts 47 are provided in the sliding element 40 in accordance with FIGS. 10 and 11, so that the bellows section 44 shows a uniform expansion behavior.

However, within the scope of this invention it is possible to employ a bellows section 44 with areas of differing expansion behavior, in particular in accordance with the embodiments shown in FIGS. 6 to 9.

As FIG. 11 makes clear, and as represented in FIGS. 1 to 5, the piston rod 42 is surrounded and stiffened by a sheath element 31 of a support body 30. The support body 30 has a shoulder 32. An annularly circulating protrusion 32.1 is formed on the shoulder 32. This protrusion 32.1 acts on the piston bottom of the piston 43. If a counter-pressure is generated in the reception chamber 11.1 as a result of a displacement of the piston 43, and a force is introduced into the piston rod 42, for example by a furniture flap or a drawer, the protrusion 32.1 displaces the piston bottom in the direction of the displacement movement of the piston 43. Because of the displacement of the piston bottom, the area of the piston 43 is radially outwardly displaced in the transition area between the piston bottom and the bellows section 44 by the bending moment, so that a ring-shaped widening of the sliding element 40 results in this area. Thus, the piston bottom and the thickened area form a displacement arrangement. The exterior wall area of the thickened area forms a braking section, which rests against the interior wall of the reception chamber 11.1. With this braking section, it is possible to effectively brake the displacement movement of the sliding element 40.

The invention claimed is:

1. An end stop damper with a damper body, comprising:
a cylinder including a reception chamber, the reception chamber having an inner sliding surface surrounding a volume of air;
a groove that is cut into the sliding surface, the groove extending transversely with respect to a movement direction of the piston and having a first peak-to-valley height Ra<1µm;
a piston including a sealing element, the sealing element including a sealing element surface facing the sliding surface and touching a portion of the sliding surface, the sealing element surface having a second peak-to-valley height of ≦4.5 µm;
wherein the piston is displaceably guided inside the reception chamber of the cylinder, the sealing element is in contact with the sliding surface, and with a displacement of the piston a braking force acting on the piston can be exerted by an air pressure formed in the reception chamber; and
an air guidance connection connected with an environment surrounding the end stop damper adapted to release the air pressure within the reception chamber.

2. The end stop damper in accordance with claim 1, wherein the groove comprises a plurality of cut circulations in the inner surface of the sliding surface and extending transverse to a movement direction of the piston.

3. The end stop damper in accordance with claim 1, further comprising a plurality of parallel grooves.

4. The end stop damper in accordance with claim 1, further comprising a plurality of parallel grooves each extending transversely with respect to a movement direction of the piston and each having the first peak-to-valley height Ra<1 µm.

5. The end stop damper in accordance with claim 4, wherein the grooves extend at an angle of ≧0 and <5° in relation to the movement direction of the piston.

6. The end stop damper in accordance with claim 1, wherein the groove comprises a spiral groove.

7. The end stop damper in accordance with claim 6, further comprising a further groove formed in an outer surface of the sealing element, the further groove having a surface peak-to-valley height comprising a Ra between 0.4 µm and 4.5 µm.

8. The end stop damper in accordance with claim 6, wherein the spiral groove has a peak-to-valley height comprising a Ra between 0.05 µm and 1 µm.

9. The end stop damper in accordance with claim 1, wherein the sealing element is made of a flexible material, including an elastomer, and the surface of the sealing element facing the sliding surface includes a peak-to-valley height of Ra≧0.05 µm to Ra≧0.4 µm.

10. The end stop damper in accordance with claim 1, wherein the sealing element comprises a thermoplastic elastomer.

11. The end stop damper in accordance with claim 10, wherein the thermoplastic elastomer comprises an olefin.

12. The end stop damper in accordance with claim 1, wherein the piston has a bellows section which as a function of pressure conditions in the reception chamber is in active connection with the cylinder.

13. The end stop damper in accordance with claim 12, wherein the bellows section has areas of different expansion capabilities at least in an area in contact with the cylinder.

14. The end stop damper in accordance with claim 1, wherein the piston has a bellows section that provides areas of different expansion capabilities formed by portions of the bellows section having differing wall thicknesses.

15. The end stop damper in accordance with claim 1, wherein a bellows section has groove-shaped cutouts that form a cross-sectional change of the bellows section.

16. The end stop damper in accordance with claim 15, wherein the cutouts extend in a direction of displacement movement of the piston, at an angle of less than 90° relative to the direction of displacement movement, or spirally.

17. The end stop damper in accordance with claim 1, wherein a displacement arrangement of the piston is actuatable as a function of a size of the counter-force acting on the piston opposite the displacement direction of the piston, and the displacement arrangement brings a braking section of a bellows section into active connection with the cylinder for damping a displacement movement of the piston.

18. The end stop damper in accordance with claim 17, wherein the piston is connected to a piston rod, and the displacement arrangement is actuatable by the piston rod, wherein when the displacement arrangement is actuated a cross sectional dimension of the braking section is changed.

19. The end stop damper in accordance with claim 1, wherein a bellows section and the piston are connected as one part with each other, and/or the piston rod is formed as one part on the piston.

20. The end stop damper in accordance with claim 1, wherein a support body surrounds a piston rod, the support body has an impact side arranged outside the damper body, and the support body includes a shoulder supported on the piston.

21. The end stop damper in accordance with claim 20, wherein the piston rod is stiffened by a sheath element disposed around the piston rod, wherein the piston rod forms an impact element made of a flexible material on a side facing away from the piston, wherein the impact element extends beyond the sheath element.

22. The end stop damper in accordance with claim 1, wherein a bellows section has a cylinder-shaped portion maintained at a distance from the interior wall of the cylinder, and an area surrounded by the cylinder-shaped portion is assigned to a pressure chamber of the cylinder.

23. The end stop damper in accordance with claim 22, wherein areas of different expansion capability are arranged in the cylinder-shaped portion of the bellows section.

24. The end stop damper in accordance with claim 23, wherein the cylinder-shaped portion of the bellows section forms a spring receptacle in which a spring is at least partially received.

25. The end stop damper in accordance with claim 1, wherein the sealing element formed on a bellows section seals a pressure chamber and an underpressure chamber of the cylinder against each other.

26. The end stop damper in accordance with claim 1, wherein an underpressure chamber and/or a pressure chamber are in connection with the environment surrounding the end stop damper by at least one opening in the cylinder.

27. The end stop damper in accordance with claim 26, wherein at least one of the openings has a diameter D<0.2 mm, preferably <0.1 mm.

28. The end stop damper in accordance with claim 26, wherein a ratio of a cross-sectional surface of the piston in the area facing the hollow space to a cross section of the opening is greater than 4,000/1.

29. An end stop damper with a damper body, comprising:
a cylinder including a reception chamber, the reception chamber having an inner sliding surface surrounding a volume of air, the inner sliding surface including a <1 μm deep groove therein, the groove extending transversely with respect to a movement direction of the piston;
a piston including a sealing element, the sealing element including a sealing element surface facing the sliding surface and touching a portion of the sliding surface, the sealing element surface having a Ra of $\leq 4.5$ μm;
wherein the piston is displaceably guided inside the reception chamber of the cylinder, the sealing element is in contact with the sliding surface, and with a displacement of the piston a braking force acting on the piston can be exerted by an air pressure formed in the reception chamber, and
an air guidance connection including an opening connected with an environment surrounding the end stop damper adapted to release the air pressure within the reception chamber.

30. The end stop damper in accordance with claim 29, further comprising a plurality of parallel grooves.

31. The end stop damper in accordance with claim 29, wherein the groove comprises a spiral groove.

* * * * *